(12) United States Patent
Kusuda

(10) Patent No.: US 9,723,568 B2
(45) Date of Patent: Aug. 1, 2017

(54) COMMUNICATION APPARATUS AND DISPLAY APPARATUS

(71) Applicant: CANON KABUSHIKI KAISHA, Tokyo (JP)

(72) Inventor: Teruya Kusuda, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/193,683

(22) Filed: Jun. 27, 2016

(65) Prior Publication Data

US 2017/0006250 A1    Jan. 5, 2017

(30) Foreign Application Priority Data

Jun. 30, 2015 (JP) ................... 2015-132141

(51) Int. Cl.
| | |
|---|---|
| *H04W 52/22* | (2009.01) |
| *H04N 21/41* | (2011.01) |
| *H04N 21/436* | (2011.01) |
| *H04N 21/434* | (2011.01) |
| *H04L 29/06* | (2006.01) |
| *H04N 21/4363* | (2011.01) |

(52) U.S. Cl.
CPC .......... *H04W 52/221* (2013.01); *H04L 65/60* (2013.01); *H04N 21/4122* (2013.01); *H04N 21/4348* (2013.01); *H04N 21/43615* (2013.01); *H04N 21/43632* (2013.01)

(58) Field of Classification Search
CPC . H04W 52/221; H04L 65/60; H04N 21/4122; H04N 21/4348; H04N 21/43615; H04N 21/43632
See application file for complete search history.

(56) References Cited

U.S. PATENT DOCUMENTS

2009/0002551 A1*  1/2009  Yamamoto ........... H04N 7/0122
                                                         348/441
2011/0206035 A1*  8/2011  Lee ..................... H04L 12/2838
                                                         370/351

(Continued)

FOREIGN PATENT DOCUMENTS

JP        2014-071436 A    4/2014

*Primary Examiner* — Michael Teitelbaum
(74) *Attorney, Agent, or Firm* — Canon USA, Inc. IP Division

(57) ABSTRACT

A communication apparatus includes a terminal unit, first-signal and second-signal converting units, a selector, and a controller. The terminal unit may alternatively receive a first signal having multiplexed signals based on different standards, a second signal which is one of the signals, and a third signal based on a standard different from the standards of the signals. The first-signal converting unit converts the first or second signal into an internal connection signal. The second-signal converting unit converts the second or third signal into the internal connection signal. The selector performs switching so that a signal from the terminal unit is connected to the first-signal or second-signal converting unit. The controller controls the selector so that, when one of the first-signal and second-signal converting unit is converting the second signal into the internal connection signal, the signal from the terminal unit is connected to the other signal converting unit.

20 Claims, 4 Drawing Sheets

(56) References Cited

U.S. PATENT DOCUMENTS

2012/0127434 A1* 5/2012 Sasazaki ............ G02B 27/2264
353/7
2014/0092312 A1* 4/2014 Furihata ................. H04N 5/268
348/706

* cited by examiner

COMMUNICATION APPARATUS AND DISPLAY APPARATUS

BACKGROUND OF THE INVENTION

Field of the Invention

The present invention relates to a communication apparatus which is capable of receiving a multiplexed transmission signal, and a display apparatus including the communication apparatus.

Description of the Related Art

Apparatuses employing HDBaseT® have been commercially practical. HDBaseT is a standard for multiplex transmission in which multiple signals based on different standards, such as a video, sound, Ethernet®, a serial control signal, and power, are multiplexed and in which the multiplexed signal is transmitted through a single Ethernet cable.

In the HDBaseT standard, when HDBaseT devices are connected to each other, the connection is established by using the HDBaseT communication protocol, whereby communication may be performed. When an HDBaseT device is connected as an Ethernet device, the HDBaseT device operates as an Ethernet device, and the connection is established by using the Ethernet communication protocol, whereby communication may be performed (HDBaseT Alliance, "What is HDBaseT?", "Ethernet", [online], Jun. 1, 2015, Internet <URL:http://www.hdbaset.org/technology>).

A projector has been disclosed which is capable of establishing a connection with each of an HDBaseT device and an Ethernet device (Japanese Patent Laid-Open No. 2014-71436).

SUMMARY OF THE INVENTION

The present invention provides a communication apparatus including a terminal unit, a first-signal converting unit, a second-signal converting unit, a selector, and a controller. The terminal unit alternatively receives a first signal, a second signal, and a third signal. The first signal is a signal in which a plurality of signals based on different standards are multiplexed. The second signal is one of the plurality of signals. The third signal is based on a standard different from the standards of the plurality of signals. The first-signal converting unit converts the first signal or the second signal into an internal connection signal. The second-signal converting unit converts the second signal or the third signal into the internal connection signal. The selector performs switching such that a signal from the terminal unit is connected to the first-signal converting unit or the second-signal converting unit. The controller controls the selector such that, when one of the first-signal converting unit and the second-signal converting unit is converting the second signal into the internal connection signal, the signal from the terminal unit is connected to the other signal converting unit.

Further features of the present invention will become apparent from the following description of exemplary embodiments with reference to the attached drawings.

DESCRIPTION OF THE EMBODIMENTS

When an HDBaseT device described above and an Ethernet device are connected to each other, the communication speed is set to a communication speed for the Ethernet function provided for HDBaseT. Therefore, even when an Ethernet environment with which connection is established enables higher-speed communication, the communication speed is controlled so as to be equal to the communication speed for the Ethernet function provided for HDBaseT.

Similarly, in the related art disclosed in Japanese Patent Laid-Open No. 2014-71436 described above, when a user connects an Ethernet device to an HDBaseT device connector by mistake, the communication speed is controlled so as to be equal to the communication speed for the Ethernet function provided for HDBaseT.

Therefore, the present invention provides a communication apparatus which is capable of performing communication at high speed when a multiplexed-signal transmitting and receiving device such as an HDBaseT device is connected to a device which supports one of the signals in the multiplexed signal, for example, an Ethernet device. The present invention also provides a display apparatus including the communication apparatus.

Exemplary embodiments of the present invention will be described below in detail on the basis of the attached drawings.

First Embodiment

Figure 1:
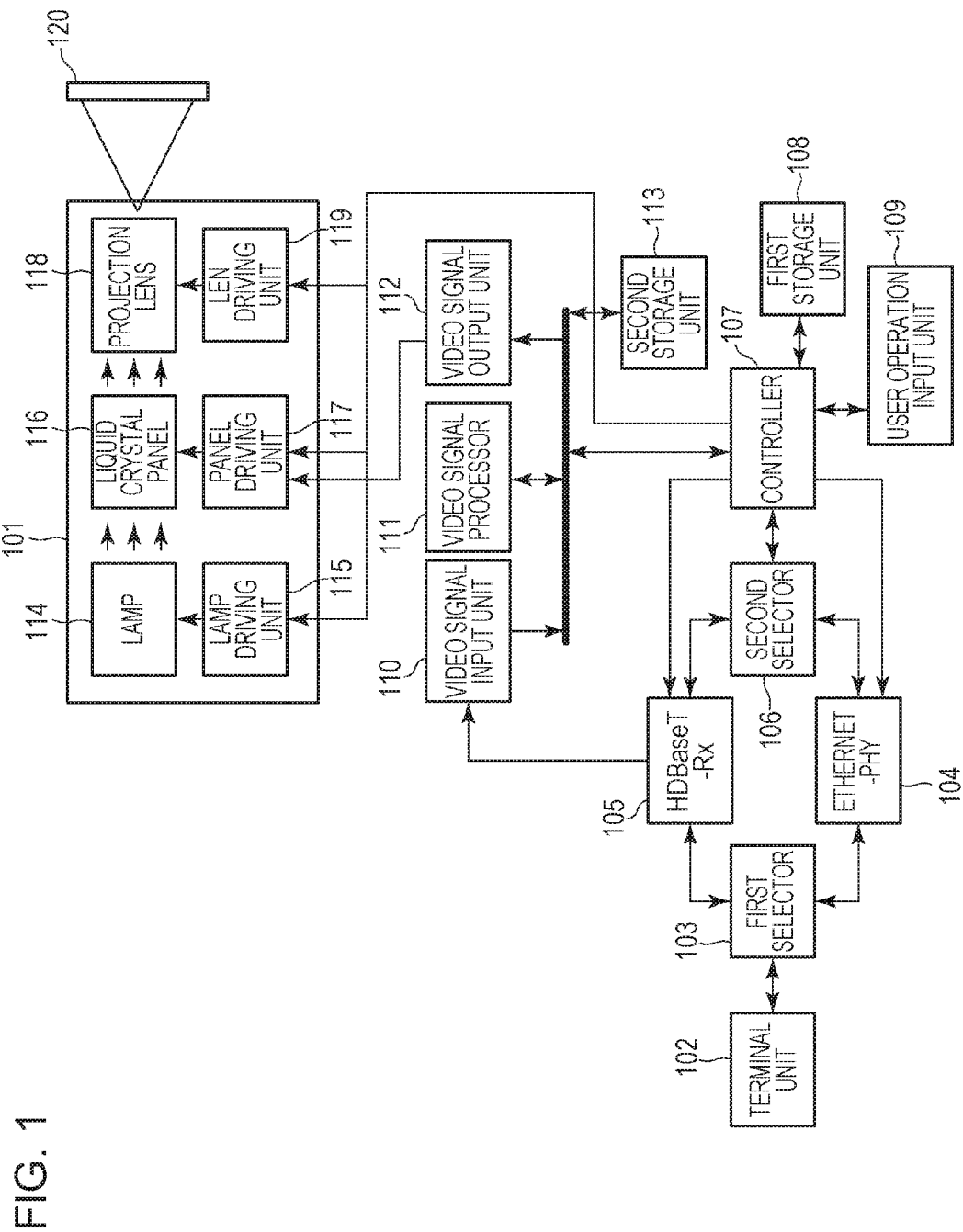
FIG. 1 is a diagram illustrating the schematic configuration of a projector including a communication apparatus according to a first embodiment of the present invention.

FIG. 1 illustrates the schematic configuration of a projector which functions as a display apparatus and which includes a communication apparatus according to a first embodiment of the present invention.

A terminal unit 102 which is an 8-position 8-conductor modular connector or the like is connected to an Ethernet cable. The terminal unit 102 is capable of alternatively receiving, as a received signal, a signal based on the HDBaseT standard (first signal), a signal based on the Fast Ethernet standard (second signal), and a signal base on the Gigabit Ethernet standard (third signal) which are transmitted from an external transmission apparatus.

The received signal is output to a first selector 103. The first selector 103 outputs the received signal to an Ethernet-PHY 104 or an HDBaseT-Rx 105 on the basis of a control signal from a controller 107.

The Ethernet-PHY 104 receives a signal based on the Gigabit Ethernet standard, and performs physical layer processing, such as frame encoding, serial-parallel conversion, and signal waveform conversion. The physical layer processing causes the received signal to be converted, for example, into a reduced gigabit media independent interface (RGMII) signal (internal connection signal). The Ethernet-PHY 104 may also receive, for example, a signal based on the Fast Ethernet standard for which the communication speed is slower than that for the Gigabit Ethernet standard, and, similarly to a signal based on the Gigabit Ethernet standard, may perform physical layer processing to convert the signal into an RGMII signal.

The HDBaseT-Rx 105 receives a signal based on the HDBaseT standard, and demultiplexes the signal into a video signal, a Fast Ethernet signal, and the like which are multiplexed in the signal. The video signal obtained through the demultiplexing is output to a video signal input unit 110.

The Fast Ethernet signal obtained through the demultiplexing is subjected by the HDBaseT-Rx 105 to physical layer processing, such as frame encoding, serial-parallel conversion, signal waveform conversion, and the like. The physical layer processing causes the signal to be converted, for example, into a media independent interface (MII) signal (internal connection signal).

The HDBaseT-Rx 105 is also capable of receiving a signal based on the Fast Ethernet standard. Similarly to the Fast Ethernet signal obtained through the demultiplexing when a signal based on the HDBaseT standard is received, the received signal is converted into an MII signal.

Therefore, a signal based on the Fast Ethernet standard may be received by either of the Ethernet-PHY 104 and the HDBaseT-Rx 105.

In the first embodiment, the Ethernet-PHY 104 is capable of performing communication at a speed higher than that for the Ethernet communication speed specification provided for the HDBaseT-Rx 105.

A second selector 106 connects a signal obtained through conversion performed by the Ethernet-PHY 104 or the HDBaseT-Rx 105, to the controller 107 on the basis of a control signal from the controller 107.

A first storage unit 108 stores programs executed by the controller 107, adjustment parameters for video processing which are used by a video signal processor 111, and the like. The first storage unit 108 is a nonvolatile memory or the like, and the stored information is held even when the power is turned off.

A user operation input unit 109 outputs a user operation instruction or the like which is input, for example, by using an operating button provided on a remote controller or the projector body, to the controller 107.

The video signal input unit 110 receives a video signal from the outside or a video signal which is output from the HDBaseT-Rx 105, on the basis of a control signal from the controller 107, and outputs the video signal to the video signal processor 111 and a second storage unit 113.

The second storage unit 113 stores video signals and the like which are output from the video signal input unit 110 and the video signal processor 111.

The video signal processor 111 performs predetermined video processing on a video signal received from the video signal input unit 110 or a video signal stored in the second storage unit 113, on the basis of a control signal from the controller 107. For example, the video signal processor 111 performs image quality adjustment in brightness and contrast, color shades, edge enhancement, and the like of a video, scaling-up/down of an image, on-screen display (OSD) combining processing, and the like.

A video signal output unit 112 outputs a video signal which has been processed by the video signal processor 111, and a video signal which has been processed by the video signal processor 111 and which is stored in the second storage unit 113, to a projecting unit 101 on the basis of a control signal from the controller 107.

The projecting unit 101 includes a lamp 114, a lamp driving unit 115, a liquid crystal panel set 116, a panel driving unit 117, a projection lens 118, and a lens driving unit 119.

The lamp 114 outputs white light, and a high pressure mercury lamp or the like is used as the lamp 114. The lamp driving unit 115 controls driving power to the lamp 114 on the basis of a control signal from the controller 107 so that, for example, the lamp 114 is turned on/off.

The white light from the lamp 114 is separated, by using dichroic mirrors (not illustrated), into green (hereinafter designated as G) component light, red (hereinafter designated as R) component light, and blue (hereinafter designated as B) component light. Each of the G, R, and B component lights obtained through the separation passes through a corresponding polarizing beam splitter (not illustrated), and is supplied to the liquid crystal panel set 116.

The panel driving unit 117 generates driving signals for driving the liquid crystal panel set 116, on the basis of control signals for the respective liquid crystal panels which are output from the controller 107 and the video signal which is output from the video signal output unit 112.

For each of the G, B, and R component lights, the liquid crystal panel prepared for the color causes polarization to be controlled in accordance with the driving signal for the color which is output from the panel driving unit 117. Light from the liquid crystal panel returns back to the polarizing beam splitter again, and is separated into light supplied to an X prism (not illustrated) as incident light and light returning back to the lamp direction, in accordance with the polarization state. The X prism is used to combine the G, R, and B component lights, and the resulting light is supplied to the projection lens 118 as synthetic light.

The lens driving unit 119 adjusts focusing, the zooming factor, and the like of the projection lens 118 on the basis of a control signal from the controller 107. The projection lens 118 projects the supplied synthetic light onto a screen 120 by using any magnification so as to display a video.

Figure 2:
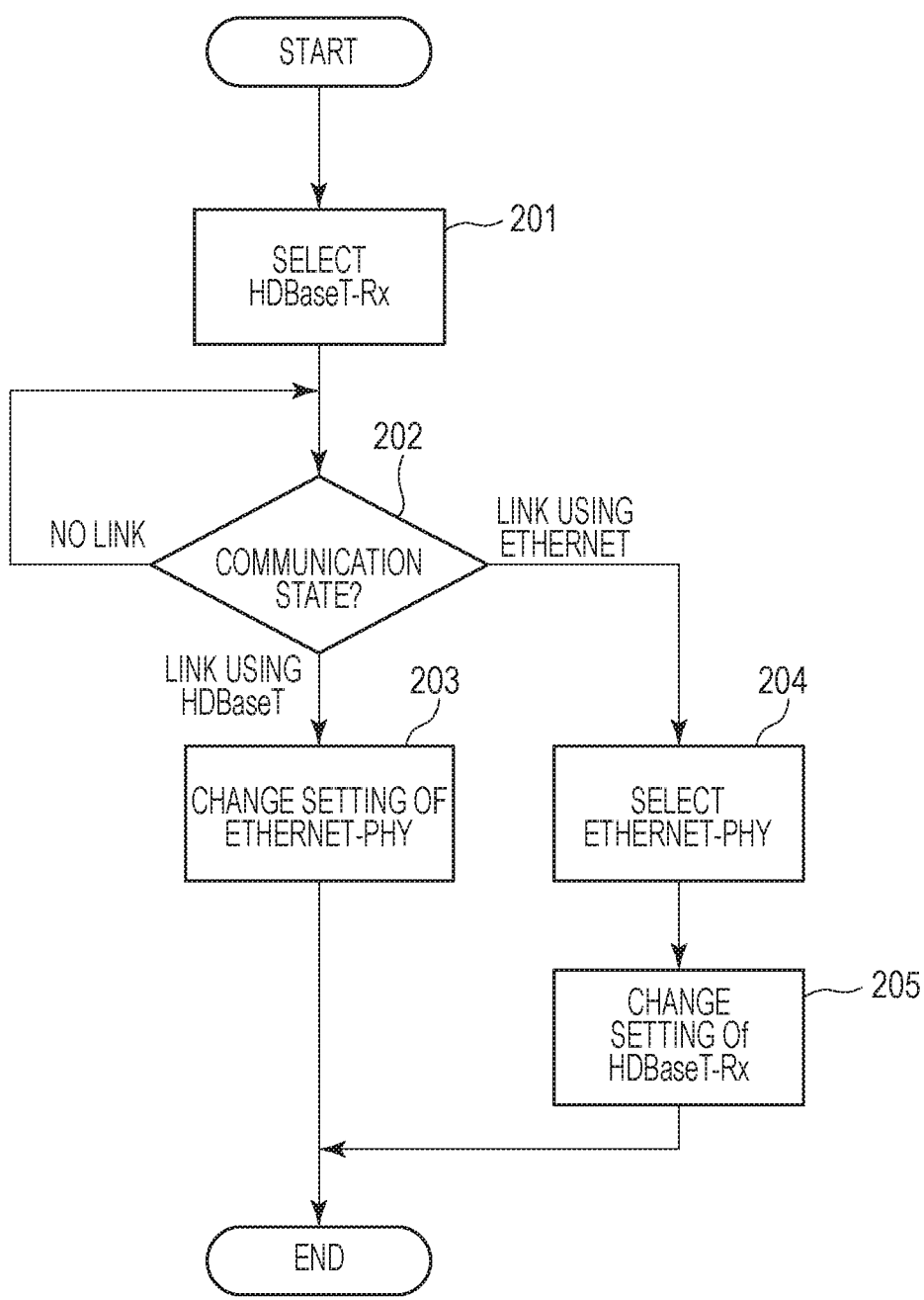
FIG. 2 is a flowchart according to the first embodiment.

By using the flowchart in FIG. 2, operations performed by the controller 107 according to the first embodiment will be described.

In step 201 in which the HDBaseT-Rx 105 is selected, the controller 107 controls the first selector 103 so that a signal received by the terminal unit 102 is connected to the HDBaseT-Rx 105. In addition, the controller 107 controls the second selector 106 so that the HDBaseT-Rx 105 is connected to the controller 107.

In step 202, the controller 107 transmits a command for checking the communication state, to the HDBaseT-Rx 105 so as to check the signal which is being received by the HDBaseT-Rx 105.

If it is checked that the HDBaseT-Rx 105 is receiving a signal based on the HDBaseT standard and that a link has been established, it may be determined that the connecting communication environment is an HDBaseT communication environment. Therefore, the connection to the HDBaseT-Rx 105 remains to be established, and the process proceeds to step 203.

In contrast, if it is checked that the HDBaseT-Rx 105 is receiving a signal based on the Fast Ethernet standard and that a link has been established, it may be determined that the connecting communication environment is an Ethernet communication environment. In this case, the process proceeds to step 204, and switching to the Ethernet-PHY 104 is performed.

If it is checked that a communication signal fails to be received and that a link has not been established, the controller 107 checks the communication state of the HDBaseT-Rx 105 again.

In step 203, a setting of the Ethernet-PHY 104 that is not currently being used is changed. The Ethernet-PHY 104 is provided with a mode in which the Ethernet-PHY 104 operates with power consumption lower than that in the normal operating state and which is used, for example, when the Ethernet-PHY 104 intermittently operates. Therefore, the Ethernet-PHY 104 is set to the low power consumption mode, whereby the power consumption may be reduced.

When the Ethernet-PHY 104 is not provided with a mode for reduction in power consumption, the power may be turned off.

In step 204 in which the Ethernet-PHY 104 is selected, the controller 107 controls the first selector 103 so that the signal received by the terminal unit 102 is connected to the Ethernet-PHY 104. In addition, the controller 107 controls the second selector 106 so that the Ethernet-PHY 104 is connected to the controller 107.

When the process proceeds to step 204, the HDBaseT-Rx 105 has received a signal based on the Fast Ethernet standard and a link has been established. The link is switched to the Ethernet-PHY 104. In the Ethernet standard, when a link is to be established, a signal for automatic recognition which is called a fast link pulse is transmitted so that information about the communication speed and scheme is received/transmitted from/to the other device, whereby the speed is determined. When a device which does not support automatic recognition is the target device, a specific signal transmitted from the device which does not support automatic recognition is received so that the speed of the device is used for communication.

Therefore, by switching to the Ethernet-PHY 104, the link is temporarily disconnected. In establishing of another link, when the connecting communication environment is based on the Gigabit Ethernet standard, communication based on the Gigabit Ethernet standard may be performed.

In step 205, a setting of the HDBaseT-Rx 105 that is not currently used is changed. The HDBaseT-Rx 105 is provided with a mode for reducing power consumption, for example, by limiting functions. Therefore, the HDBaseT-Rx 105 is set to the mode of low power consumption, whereby the power consumption may be suppressed. Alternatively, the power of the HDBaseT-Rx 105 may be turned off, achieving reduction in power consumption.

As described above, according to the first embodiment, when the HDBaseT-Rx 105 is receiving a signal based on the Fast Ethernet standard, switching to the Ethernet-PHY 104 that is the other unit is performed. Therefore, when the projector (communication apparatus) is connected to an Ethernet device, the Ethernet-PHY 104 is selected, enabling communication to be performed at a speed higher than that for the Ethernet speed specification provided for HDBaseT.

When the projector (communication apparatus) is connected an HDBaseT device, the HDBaseT-Rx 105 is selected, enabling a signal based on the HDBaseT standard to be received.

Second Embodiment

Figure 3:
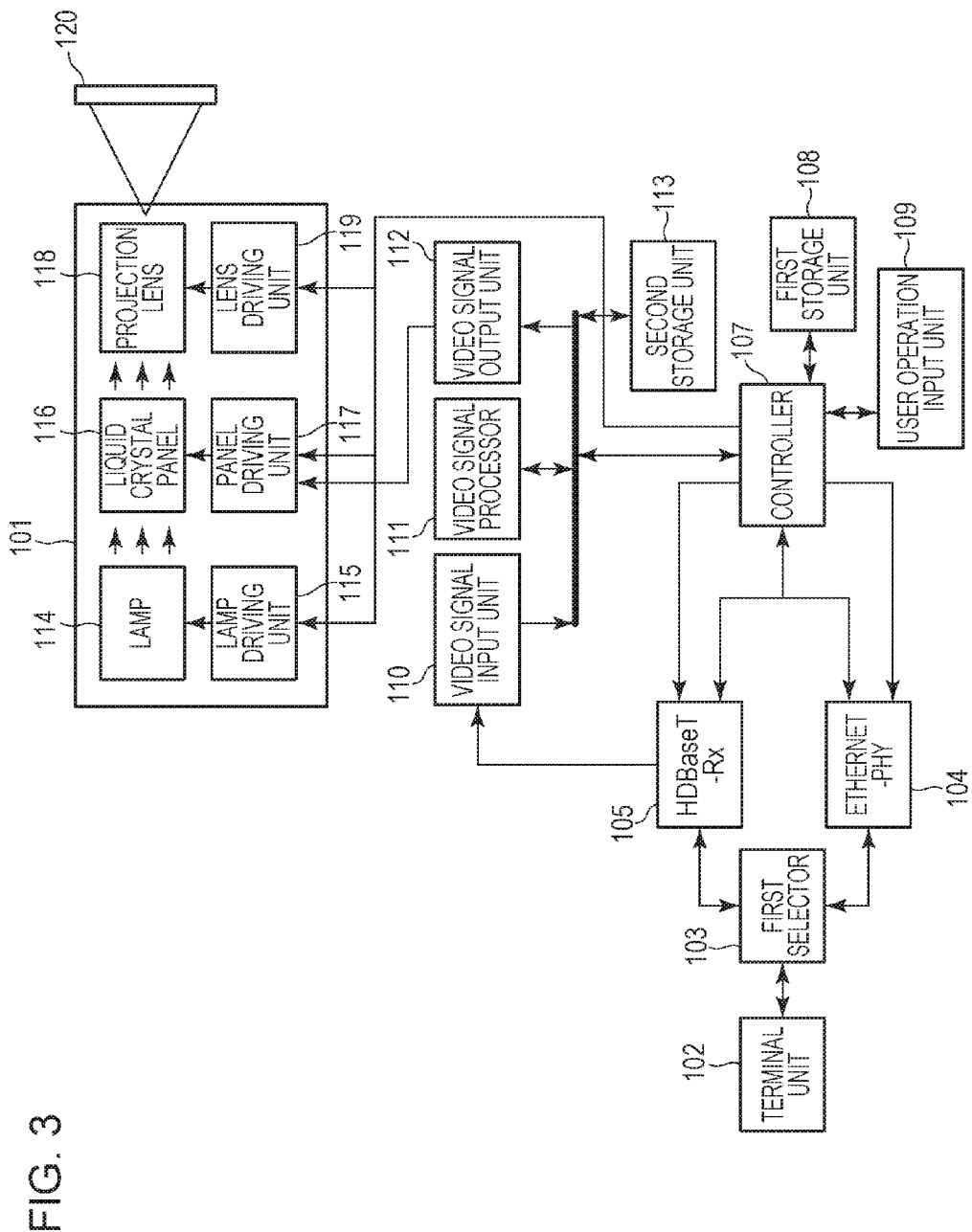
FIG. 3 is a diagram illustrating the schematic configuration of a projector including a communication apparatus according to a second embodiment of the present invention.

FIG. 3 illustrates the schematic configuration of a projector which functions as a display apparatus and which includes a communication apparatus according to a second embodiment of the present invention. The difference from the first embodiment is that the second selector 106 is deleted. Components having the same reference numerals as those in the first embodiment will not be described.

The controller 107 is capable of being connected to each of the internal connection signal of the Ethernet-PHY 104 and that of the HDBaseT-Rx 105 without using a selector. An internal-connection-signal connecting unit of the controller 107 is connected to an internal connection signal which is transmitted from the Ethernet-PHY 104 or the HDBaseT-Rx 105, and a part of which is used as a common part and a part of which is used as a dedicated part. The controller 107 sets, to high impedance, the output from a signal converting unit which is not being used, whereby an internal connection signal from a signal converting unit which is being used may be connected to the controller 107.

The first storage unit 108 stores past connection history information indicating whether the Ethernet-PHY 104 or the HDBaseT-Rx 105 has been connected, in addition to the programs executed by the controller 107, the adjustment parameters for video processing which are used by the video signal processor 111, and the like.

Figure 4:
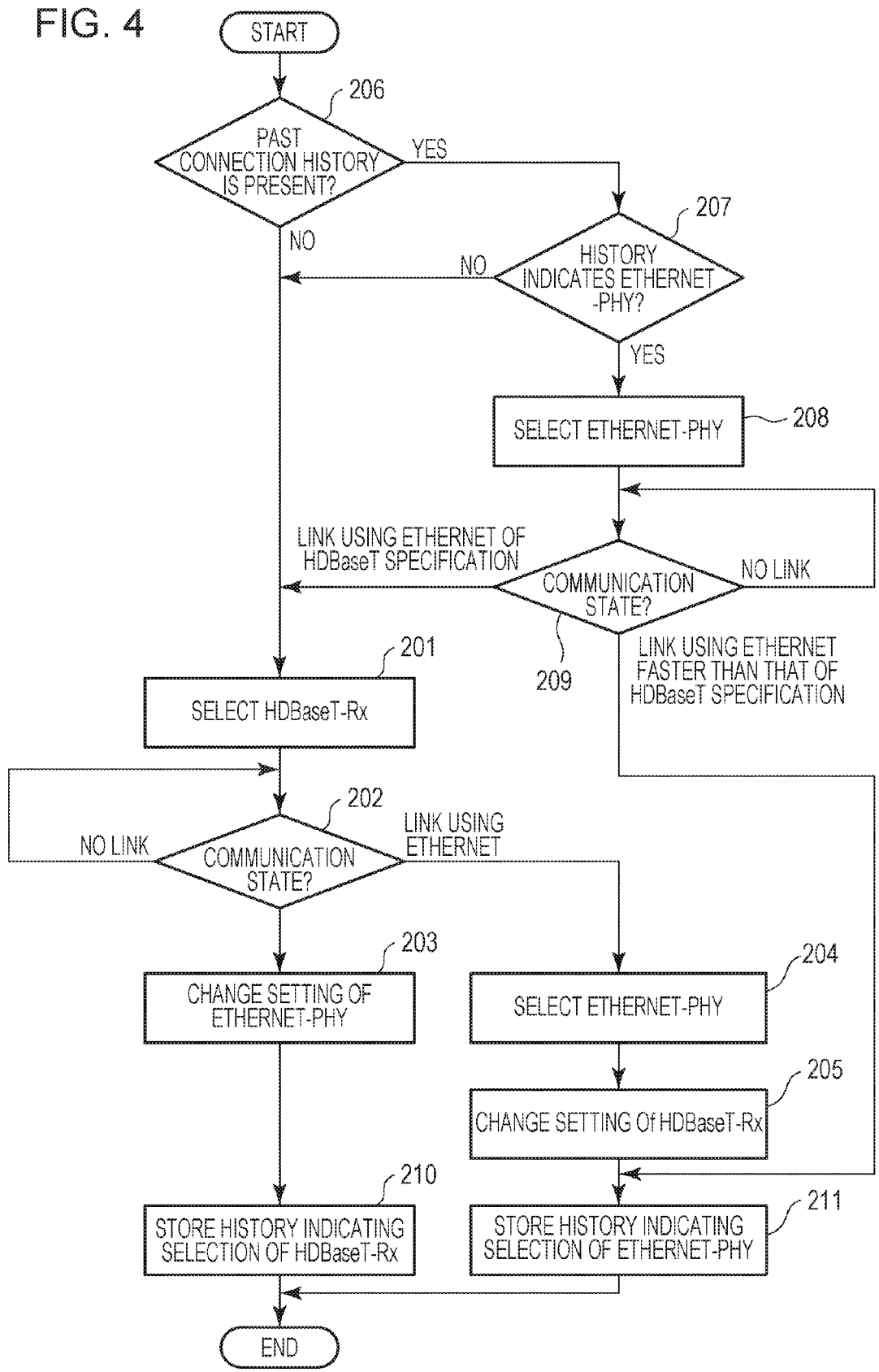
FIG. 4 is a flowchart according to the second embodiment.

By using the flowchart in FIG. 4, operations performed by the controller 107 according to the second embodiment will be described. The difference from the first embodiment is that steps 206 to 211 are added. Steps having the same step numbers as those in the first embodiment will not be described.

In step 206, it is checked whether or not a past connection history is present. If the first storage unit 108 stores the connection history information, the process proceeds to step 207. If the first storage unit 108 does not store the connection history information, such as in the initial state, the process proceeds to step 201.

In step 207, a signal converting unit which is to be first connected is determined from the past connection history information. If the Ethernet-PHY 104 has been connected, the process proceeds to step 208. If the HDBaseT-Rx 105 has been connected, the process proceeds to step 201.

In step 208, the Ethernet-PHY 104 is connected. Similarly to step 204, the first selector 103 is controlled so that the setting for output of the HDBaseT-Rx 105 is changed, whereby the Ethernet-PHY 104 is connected.

In step 209, the controller 107 transmits, to the Ethernet-PHY 104, a command for checking the communication state, and checks a signal which is being received by the Ethernet-PHY 104.

If it is checked that the Ethernet-PHY 104 is receiving a signal based on the Gigabit Ethernet standard and that a link has been established, it may be determined that the connecting communication environment is a Gigabit Ethernet communication environment. Therefore, the connection to the Ethernet-PHY 104 remains to be established, and the process proceeds to step 211.

If it is checked that the Ethernet-PHY 104 is receiving a signal based on the Fast Ethernet standard and that a link has been established, the connecting communication environment may be an environment in which an HDBaseT transmission apparatus operates as an Ethernet device. Therefore, in this case, the process proceeds to step 201, and switching to the HDBaseT-Rx 105 is performed.

When the process proceeds from step 209 to step 201, the Ethernet-PHY 104 has received a signal based on the Fast Ethernet standard, and a link has been established. The link is switched to the HDBaseT-Rx 105. In the HDBaseT standard, when a link is to be established, it is determined whether or not a connected device supports the HDBaseT standard.

Therefore, the link is temporarily disconnected. In establishing of another link, when the connecting communication environment is based on the HDBaseT standard, communication based on the HDBaseT standard may be performed.

If it is checked that a communication signal has not been received and that a link has not been established, the controller 107 checks the communication state of the HDBaseT-Rx 105 again.

In step 210 in which the connecting state is stored, information indicating that "the HDBaseT-Rx 105 has been connected" is stored in the first storage unit 108.

In step 211 which is similar to step 210 and in which the connecting state is stored, information indicating that "the Ethernet-PHY 104 has been connected" is stored in the first storage unit 108.

As described above, according to the second embodiment, if the Ethernet-PHY 104 is first connected on the basis of the past connection history information and if a signal based on the Fast Ethernet standard is being received, switching to the HDBaseT-Rx 105 which is the other unit is performed. Therefore, when the projector (communication apparatus) is connected to an HDBaseT device, the projector (communication apparatus) may receive a signal based on the HDBaseT standard.

If the HDBaseT-Rx 105 is connected on the basis of the past connection history or the like and if a signal based on the Fast Ethernet standard is being received, switching to the Ethernet-PHY 104 which is the other unit is performed. Therefore, when the projector (communication apparatus) is connected to an Ethernet device, connection with the Ethernet-PHY 104 enables communication to be performed at a speed higher than that for the Ethernet speed specification provided for HDBaseT.

The exemplary embodiments of the present invention are described. The present invention is not limited to these embodiments. Various changes and modifications may be made within the range of the gist of the present invention.

The example of a projector is described. As long as it is a display apparatus having a display unit including the HDBaseT-Rx 105, a similar configuration may be applied except the projecting unit 101 which is specific to a projector.

For example, the operating mode of a signal converting unit which is not being used is changed. When power consumption does not need to be considered, changing of the operating mode and turning-off of the power do not need to be performed.

The controller may have a configuration in which signals from the two signal converting units are capable of being received, and the controller may select a signal.

In the second embodiment, determination is made so that the signal converting unit which was selected the last time is selected. Selection histories are accumulated and stored, and a signal converting unit which has been selected many times may be selected with high priority.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132141 filed Jun. 30, 2015, which is hereby incorporated by reference herein in its entirety.

What is claimed is:

1. A communication apparatus comprising:
a terminal unit configured to alternatively receive a first signal, a second signal, and a third signal, the first signal being a signal in which a plurality of signals based on different standards are multiplexed, the second signal being one of the plurality of signals, the third signal being based on a standard different from the standards of the plurality of signals;
a first-signal converting unit configured to convert the first signal or the second signal into an internal connection signal;
a second-signal converting unit configured to convert the second signal or the third signal into the internal connection signal;
a selector configured to perform switching such that a signal from the terminal unit is connected to the first-signal converting unit or the second-signal converting unit; and
a controller configured to control the selector such that, when one of the first-signal converting unit and the second-signal converting unit is converting the second signal into the internal connection signal, the signal from the terminal unit is connected to the other signal converting unit.

2. The communication apparatus according to claim 1, further comprising:
a storage unit configured to store information about a signal converting unit having been connected to the terminal unit,
wherein the controller determines whether the signal from the terminal unit is to be connected to the first-signal converting unit or the second-signal converting unit, in accordance with the information.

3. The communication apparatus according to claim 1, wherein, when the first-signal converting unit is converting the second signal into the internal connection signal, the controller controls the selector such that the signal from the terminal unit is connected to the second-signal converting unit.

4. The communication apparatus according to claim 1, wherein, when the second-signal converting unit is converting the second signal into the internal connection signal, the controller controls the selector such that the signal from the terminal unit is connected to the first-signal converting unit, and, when the first-signal converting unit is converting the second signal into the internal connection signal, the controller controls the selector such that the signal from the terminal unit is connected to the second-signal converting unit.

5. The communication apparatus according to claim 1, wherein the controller sets an operating mode of a signal converting unit to a state in which power consumption is lower than power consumption in a normal operating state, the signal converting unit being not connected to the terminal unit.

6. The communication apparatus according to claim 1, wherein the controller turns off power of a signal converting unit that is not connected to the terminal unit.

7. The communication apparatus according to claim 1, wherein the first signal is a signal based on an HDBaseT standard,
wherein the second signal is a signal based on a Fast Ethernet standard, and
wherein the third signal is a signal based on a Gigabit Ethernet standard.

8. A display apparatus comprising:
a communication apparatus; and
a display unit configured to display a video,
wherein the communication apparatus comprises
a terminal unit configured to alternatively receive a first signal, a second signal, and a third signal, the first signal being a signal in which a plurality of signals based on different standards are multiplexed, the second signal being one of the plurality of signals, the third signal being based on a standard different from the standards of the plurality of signals,
a first-signal converting unit configured to convert the first signal or the second signal into an internal connection signal,
a second-signal converting unit configured to convert the second signal or the third signal into the internal connection signal,
a selector configured to perform switching such that a signal from the terminal unit is connected to the first-signal converting unit or the second-signal converting unit, and
a controller configured to control the selector such that, when one of the first-signal converting unit and the second-signal converting unit is converting the second signal into the internal connection signal, the signal from the terminal unit is connected to the other signal converting unit.

9. The display apparatus according to claim 8, further comprising:
a storage unit configured to store information about a signal converting unit having been connected to the terminal unit,
wherein the controller determines whether the signal from the terminal unit is to be connected to the first-signal converting unit or the second-signal converting unit, in accordance with the information.

10. The display apparatus according to claim 8, wherein, when the first-signal converting unit is converting the second signal into the internal connection signal, the controller controls the selector such that the signal from the terminal unit is connected to the second-signal converting unit.

11. The display apparatus according to claim 8, wherein, when the second-signal converting unit is converting the second signal into the internal connection signal, the controller controls the selector such that the signal from the terminal unit is connected to the first-signal converting unit, and, when the first-signal converting unit is converting the second signal into the internal connection signal, the controller controls the selector such that the signal from the terminal unit is connected to the second-signal converting unit.

12. The display apparatus according to claim 8, wherein the controller sets an operating mode of a signal converting unit to a state in which power consumption is lower than power consumption in a normal operating state, the signal converting unit being not connected to the terminal unit.

13. The display apparatus according to claim 8, wherein the controller turns off power of a signal converting unit that is not connected to the terminal unit.

14. The display apparatus according to claim 8, wherein the first signal is a signal based on an HDBaseT standard,
wherein the second signal is a signal based on a Fast Ethernet standard, and
wherein the third signal is a signal based on a Gigabit Ethernet standard.

15. A communication method comprising:
alternatively receiving a first signal, a second signal, and a third signal by a terminal unit, the first signal being a signal in which a plurality of signals based on different standards are multiplexed, the second signal being one of the plurality of signals, the third signal being based on a standard different from the standards of the plurality of signals;
converting the first signal or the second signal into an internal connection signal by a first-signal converting unit;
converting the second signal or the third signal into the internal connection signal by a second-signal converting unit;
performing switching such that a signal from the terminal unit is connected to the first-signal converting unit or the second-signal converting unit; and
controlling the performing such that, when one of the first-signal converting unit and the second-signal converting unit is converting the second signal into the internal connection signal, the signal from the terminal unit is connected to the other signal converting unit.

16. The communication method according to claim 15, further comprising:
storing information about the other signal converting unit having been connected to the terminal unit,
wherein the controlling determines whether the signal from the terminal unit is to be connected to the first-signal converting unit or the second-signal converting unit, in accordance with the information.

17. The communication method according to claim 15, wherein, when the first-signal converting unit is converting the second signal into the internal connection signal, the controlling controls the selecting such that the signal from the terminal unit is connected to the second-signal converting unit.

18. The communication method according to claim 15, wherein, when the second-signal converting unit is converting the second signal into the internal connection signal, the controlling controls the selecting such that the signal from the terminal unit is connected to the first-signal converting unit, and, when the first-signal converting unit is converting the second signal into the internal connection signal, the controlling controls the selecting such that the signal from the terminal unit is connected to the second-signal converting unit.

19. The communication method according to claim 15,
wherein the controlling sets an operating mode of a signal
   converting unit to a state in which power consumption
   is lower than power consumption in a normal operating
   state, the signal converting unit being not connected to
   the terminal unit.

20. The communication method according to claim 15,
wherein the first signal is a signal based on an HDBaseT
   standard,
wherein the second signal is a signal based on a Fast
   Ethernet standard, and
wherein the third signal is a signal based on a Gigabit
   Ethernet standard.

\* \* \* \* \*